Nov. 14, 1961 W. BOCK ET AL 3,008,649

SPRAY NOZZLE FOR WINDSHIELD WASHING APPARATUS

Filed July 21, 1958

INVENTORS
WILLY BOCK
HANS PROHASKA
ALFRED KOHLER
BY Dike and Craig
ATTORNEYS

United States Patent Office 3,008,649
Patented Nov. 14, 1961

3,008,649
SPRAY NOZZLE FOR WINDSHIELD
WASHING APPARATUS
Willy Bock, Hans Prohaska, and Alfred Kohler, all of Bietigheim, Wurttemberg, Germany, assignors to SWF-Spezialfabrik fur Autozubehor Gustav Rau G.m.b.H., Bietigheim, Wurttemberg, Germany
Filed July 21, 1958, Ser. No. 749,857
Claims priority, application Germany July 19, 1957
8 Claims. (Cl. 239—284)

The present invention relates to a spray nozzle especially for windshield washing apparatus for automobiles and the like, and more particularly to such a spray nozzle, which is provided with a ball-and-socket joint between the universally pivotable nozzle and the base thereof.

In general, the hollow-spherical socket portion of the known types of such joints is composed of several parts to permit the insertion of the ball portion therein. Such a multiple-part socket has, however, considerable disadvantages since its manufacture and assembly is rather complicated and expensive, and also since the wear upon the socket parts caused by friction is very considerable. Such wear is particularly undesirable in such ball-and-socket joints in which the nozzle is normally to remain in a fixed adjusted position.

It is an object of the present invention to provide a ball-and-socket joint for a spray nozzle for automobile windshield washing apparatus which is more easily manufactured and assembled and retains its angular adjustment more reliably than similar joints previously devised, and which overcomes various other disadvantages of such prior joints which rendered them unsuitable for windshield washing apparatus.

A further object of the present invention is to provide a ball-and-socket joint having the usual interengaging spherical surfaces, in which each of the two members of the joint consists of only one part, and which is designed so that the wear upon these two parts will be reduced to a minimum, thus insuring a much longer useful life of the entire nozzle and, last but not least, of the entire windshield washing apparatus.

These objects of the present invention will be attained by making one of the two parts of the universally pivotable spray nozzle, that is, either the nozzle member itself or the base of the nozzle, of a soft elastic material, or by making at least the spherical portion of such part of elastic material, so that the two spherical portions of the nozzle parts may be rotatably interengaged with each other by either stretching or compressing the elastic part. It is thus possible according to the invention to make either the nozzle head or the nozzle base of rubber or a similar elastic synthetic material, while the corresponding part may be made of a rigid material, for example, metal, a hard plastic, porcelain, or the like.

Another important feature of the invention consists in also providing the nozzle base underneath its mounting surface with an annular recess and with a soft elastic flange underneath said recess which will operate like an elastic button to permit the nozzle base to be buttoned into an aperture in the body of the car in front of the windshield. In the event that the nozzle base, and especially its inlet fitting with the inlet channel therein, is made of a rigid material, the invention further provides this fitting with a covering of a soft elastic material which is made of a suitable shape so as to permit the entire nozzle base to be buttoned into a suitable aperture at the point of the car where it is to be mounted.

Further objects, features, and advantages of the present invention will become apparent from the following detailed description, thereof, particularly when read with reference to the accompanying drawings, in which—

FIGURE 4 shows a nozzle unit in which the nozzle element consists of a soft elastic material; while

Figure 1:
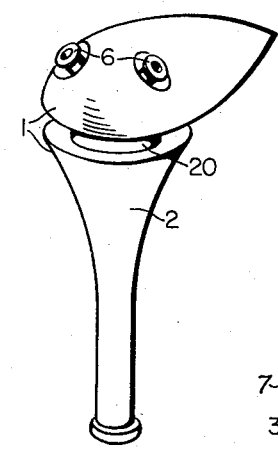
FIGURE 1 shows a perspective view of a nozzle base with metallic spray nozzles inserted therein.
Figure 2:
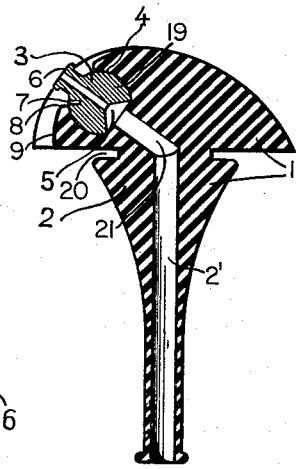
FIGURE 2 shows a cross section of the nozzle unit according to FIGURE 1.
Figure 3:
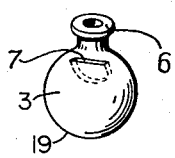
FIGURE 3 shows a perspective view of one of the spray nozzles according to FIGURES 1 and 2.

Referring to the drawings, and first particularly to FIGURES 1 to 3, the nozzle unit as therein disclosed consists of a base member 1 of a soft elastic material which has an inlet fitting 2 and a spherical part comprised by a nozzle element 3 of metal or another suitable rigid material which is fitted into base member 1. Thus the base element 1 comprises not only the part receiving the nozzle element 3 but also includes the inlet fitting 2 with which it is, in fact, integral as clearly shown in FIGURE 2. The base member is formed at one end thereof with an enlarged portion constituted by the part receiving the nozzle element 3 and the upper end portion of inlet fitting 2. This enlarged portion is provided with an annular groove 20 spacing a head portion 1 carrying the nozzle element 3 and the upper end portion of inlet fitting 2 just referred to, the head portion and inlet fitting having opposed flat surfaces forming the walls of the groove. As shown in FIGURE 2, the inlet fitting is provided with an inlet channel 2', the head portion being provided with communicating offset inlet channel means 21. Also as shown particularly in FIGURE 2, the lower end portion of inlet member 2 is formed as a tubular member with a wall of substantially constant cross section which merges with the upper end portion of the fitting, this upper end portion having a wall of a tapering cross section which decreases in thickness in directions away from the annular groove 20.

Two features of the inlet fitting lend themselves to the installation of the nozzle in a suitable aperture in a car wall. One of these is comprised by the soft resilient material composing the inlet fitting, since such material facilitates not only a ready yielding of the upper portion thereof during the operation of buttoning the nozzle in the wall aperture referred to, but further facilitates a convenient downward displacement of the lower wall of groove 20 relative to the upper wall in response to the manipulative stress on the fitting incident to the buttoning operation. This is brought about, for example, by the endwise pulling movement at the opposite end of the fitting to which it is subjected in the process of drawing it through the aperture preparatory to mounting the base member therein. Another of the above features is comprised by the above-described tapering cross section of the upper end portion of fitting 2. In installing the nozzle, it is obviously necessary to insert the small end of the inlet through the car wall aperture, and since, as shown in FIGURE 2, the central axes of the groove 20 and of the tapered portion are coincidental, the latter is enabled to act as a guiding means for the base member during such insertion. This means will insure that the bottom of the groove 20 will be in alignment with the car aperture wall at all times during the insertion process and thus will eliminate the necessity of adjustive movements of the base member in directions transverse to the above axes to effect the proper engagement of the bottom of groove 20 and the car aperture wall. This base member 1 has a hollow spherical recess 4 with an outer opening 8 of a size to permit the spherical nozzle element 3 to be pivoted therein in various directions. In order to insure an unrestricted flow of the cleaning fluid into the nozzle regardless of the angle to which the nozzle might be pivoted, the nozzle element 3 is preferably provided with a funnel-shaped recess 5 at its lower side comprised in the fluid passage means of the nozzle.

The hollow spherical recess 4 in the elastic base member 1 is preferably made of a size so as to insure that, when the nozzle element 3 is inserted therein, the walls 9 of recess 4 will cling to the metal spherical body 19 of the nozzle element 3 and provide an adequate friction to insure that the nozzle element will remain in the particular position to which it has been adjusted. In order to facilitate a removal of nozzle element 3 from its elastic socket to permit it to be exchanged or cleaned, it may be provided with an outer projecting portion 6 having a passage therethrough axially coincidental with the nozzle passage and terminating at an end surface of the projecting portion or with a radially directed slot 7 into which a screw driver or similar tool may be inserted to lift the nozzle element out of its socket.

Figure 4:
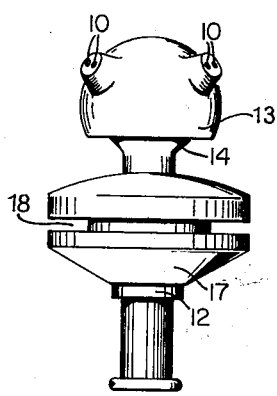
Figure 5:
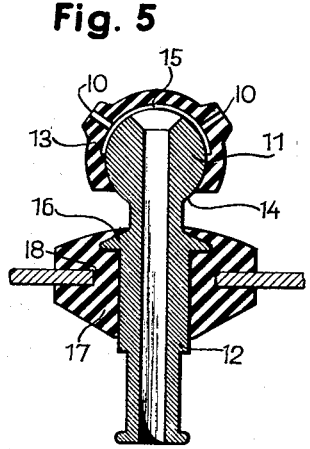
FIGURE 5 shows a cross section of the nozzle unit according to FIGURE 4.

In the modification of the invention as illustrated in FIGURES 4 and 5, the spherical base member 11 and the inlet fitting 12 thereon consists of a rigid material. In this embodiment, the nozzle member is comprised by a cap member 13 of elastic material which has a hollow spherical chamber therein with nozzle openings 10 leading to the outside as shown more particularly in FIGURE 5, is fitted over the spherical part 14 of base member 11 with sufficient tension to insure that, after being adjusted to the proper position, it will remain in such position and also cannot be lost. It may also be adjusted to spray the cleaning fluid through the nozzle openings in various directions in accordance with the inclined position of the windshield and the distance of the nozzle from the windshield. In order to insure that the flow of cleaning fluid from the inlet fitting 12 to the nozzle openings will not be obstructed by the adjustment of the elastic cap member 13, the same is provided with a recess 15 through which the cleaning fluid may pass to two or more nozzle openings. Naturally, the rigid ball-shaped nozzle-element 3 according to FIGURE 3 may be similarly provided with several spray openings.

The inlet fitting 12 has a projecting flange 16 thereon upon which a button-shaped member 17 of a soft elastic material may be fitted which has a deep annular groove 18 in its outer peripheral surface. By means of this groove 18 the entire nozzle unit may be mounted on a wall of the car body by buttoning the elastic member 17 into a suitable aperture therein.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. A spray nozzle particularly for windshield washing apparatus for automobiles and the like comprising a base member formed of soft elastic material and comprising a head portion and an inlet portion having an inlet channel, said head portion being formed with a recess therein having a spherically shaped wall, a nozzle member formed of rigid material and having a spherical surface disposed with said recess, means on said base member adapting said spray nozzle to be mounted in position in a circular aperture in the wall of a car body comprising annular groove means including opposite wall means on said head portion and on said inlet portion, said opposite wall means being in engagement with opposite sides of said car body wall and the bottom of said groove means being in engagement with the wall of said circular aperture when said spray nozzle is in said position, said inlet member being adapted for endwise insertion through said aperture preparatory to the assumption of said position by said spray nozzle, means aligning the said bottom of said groove with the said wall of said circular aperture during said insertion comprising tapered means on said inlet portion adjacent said annular groove means, said tapered means having a central axis coincident with the central axis of said groove means, said tapered means being adapted to contact the said wall of said circular aperture and to constitute a guiding means for said base member during said insertion.

2. A spray nozzle according to claim 1, wherein said inlet portion comprises a tubular member having an upper end wall portion of a tapering cross section, said upper end portion constituting said tapered means.

3. A spray nozzle according to claim 2, wherein said tubular member further comprises a lower end portion having a wall of substantially constant cross section.

4. A spray nozzle according to claim 1, wherein said tapered means is constituted by an upper end portion of said inlet portion, said upper end portion having a shape essentially conical.

5. A spray nozzle particularly for windshield washing apparatus for automobiles and the like comprising a base member and a nozzle member, said two members being connected to each other by interengaging spherical surfaces forming a ball-and-socket joint, one of said members having at least a portion including said spherical surface thereof consisting of a rigid material, and the second member having at least a portion adjacent to and including said spherical surface thereof consisting of a soft elastic material so as to permit said second member to be connected to said first member by temporary distortion of said elastic portion thereof, said base member comprising portions of varying size including an enlarged portion, said enlarged portion having an annular groove therein adapting the said spray nozzle to be mounted on the wall of a car body by buttoning said grooved enlarged portion into a suitable aperture in said wall, said base member being provided with an inlet channel and inlet channel means offset and communicating with said inlet channel passing through said enlarged portion, said inlet channel means terminating closely adjacent said nozzle member, said one member being comprised by said nozzle member, said second member being comprised by said base member, said spherical surface of said base member being comprised by a hollow spherical recess and said spherical surface of said nozzle member being comprised by a substantially spherical part engaging into said recess and substantially enclosed by the wall thereof, said nozzle member having a projection thereon extending outwardly from said spherical part to permit said nozzle member to be grasped to remove the same from said base member, said projection having a passage therethrough terminating at an end surface of said projection, the axis of said passage being coincidental with the axis of the nozzle passage.

6. A spray nozzle as defined in claim 5, wherein said nozzle member has a recess therein at a side thereof adapted to face toward the outside, said recess being spaced from said projection and adapted to permit a suitable tool to be inserted therein for removing said nozzle member from said base member.

7. A spray nozzle particularly for windshield washing apparatus for automobiles and the like comprising a base member formed of soft elastic material and comprising a head portion and an inlet portion having an inlet channel, said head portion being formed with a recess therein having a spherically shaped wall, a nozzle member formed of rigid material and having a spherical surface disposed within said recess, means for adapting said spray nozzle to be mounted on the wall of a car body comprising annular groove means spacing said head portion and said inlet portion and constituting means for receiving the wall of a suitable aperture in the said wall of a car body, said head portion having a flat surface adapted to contact one surface of said wall, said inlet portion having a flat surface adapted to contact the opposite surface of said wall, said first-mentioned flat surface being of substantially greater extent than said second-named flat surface, said groove means comprising said second-named flat surface and a portion only of said first-named flat surface, said head portion being provided with inlet channel means communicating at one end thereof with said inlet channel, said inlet channel means being offset from said inlet channel, said inlet channel means communicating at the other end thereof with said nozzle member, said nozzle member being provided with passage means comprising a funnel-shaped recess communicating with said inlet channel means.

8. A spray nozzle particularly for windshield washing apparatus for automobiles and the like comprising a base member formed of soft elastic material and comprising a head portion and an inlet portion having an inlet channel, said head portion being formed with a recess therein having a spherically shaped wall, a nozzle member formed of rigid material and having a spherical surface disposed within said recess, means for adapting said spray nozzle to be mounted on the wall of a car body comprising annular groove means spacing said head portion and said inlet portion and constituting means for receiving the wall of a suitable aperture in the said wall of a car body, said head portion having a flat surface adapted to contact one surface of said wall, said inlet portion having a flat surface adapted to contact the opposite surface of said wall, said first-mentioned flat surface being of substantially greater extent than said second-named flat surface, said groove means comprising said second-named flat surface and a portion only of said first-named flat surface, said head portion being provided with inlet channel means communicating at one end thereof with said inlet channel, said inlet channel means being offset from said inlet channel, said inlet channel means communicating at the other end thereof with said nozzle member, said groove means being so disposed as to surround the juncture of said inlet channel and said inlet channel means.

References Cited in the file of this patent

UNITED STATES PATENTS

| | | |
|---|---|---|
| 1,056,811 | McElroy | Mar. 25, 1913 |
| 2,563,300 | Anker | Aug. 7, 1951 |
| 2,703,258 | Neufeld | Mar. 1, 1955 |
| 2,703,259 | Neufeld | Mar. 1, 1955 |
| 2,716,574 | Chase | Aug. 30, 1955 |
| 2,752,201 | Blass | June 26, 1956 |
| 2,765,197 | Chimbole | Oct. 2, 1956 |
| 2,772,115 | Stanley | Nov. 27, 1956 |

FOREIGN PATENTS

| | | |
|---|---|---|
| 63,372 | France | Apr. 6, 1955 |